United States Patent
Cen et al.

(10) Patent No.: US 12,359,061 B2
(45) Date of Patent: Jul. 15, 2025

(54) GLASS FIBER REINFORCED POLYCARBONATE COMPOSITE MATERIAL, PREPARATION METHOD AND APPLICATION THEREOF

(71) Applicant: KINGFA SCI. & TECH. CO., LTD., Guangdong (CN)

(72) Inventors: Yin Cen, Guangdong (CN); Junwei Ai, Guangdong (CN); Yongwen Chen, Guangdong (CN); Mingkun Li, Guangdong (CN); Xianwen Liu, Guangdong (CN); Tipeng Zhao, Guangdong (CN); Wei Tong, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 613 days.

(21) Appl. No.: 17/638,192

(22) PCT Filed: Jul. 24, 2020

(86) PCT No.: PCT/CN2020/103915
§ 371 (c)(1),
(2) Date: Feb. 25, 2022

(87) PCT Pub. No.: WO2021/036613
PCT Pub. Date: Mar. 4, 2021

(65) Prior Publication Data
US 2022/0325098 A1  Oct. 13, 2022

(30) Foreign Application Priority Data

Aug. 30, 2019 (CN) .......................... 201910815623.7

(51) Int. Cl.
*C08L 69/00* (2006.01)
*C08J 5/04* (2006.01)
*C08K 3/32* (2006.01)
*C08K 7/14* (2006.01)
*C08L 23/06* (2006.01)
*C08G 77/448* (2006.01)

(52) U.S. Cl.
CPC .............. *C08L 69/00* (2013.01); *C08J 5/043* (2013.01); *C08G 77/448* (2013.01); *C08J 2369/00* (2013.01); *C08J 2469/00* (2013.01); *C08K 2003/324* (2013.01); *C08K 2003/329* (2013.01); *C08K 7/14* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 2007/0082995 | A1* | 4/2007 | Costanzi | C08K 5/523 524/414 |
| 2015/0086856 | A1* | 3/2015 | Tomita | H01M 50/133 524/116 |
| 2015/0353732 | A1* | 12/2015 | Wang | C08L 67/02 524/588 |
| 2016/0024301 | A1* | 1/2016 | Hayashida | C08K 5/521 523/451 |
| 2016/0340507 | A1* | 11/2016 | Ding | C08L 69/00 |
| 2018/0066133 | A1* | 3/2018 | Chen | C08K 5/523 |
| 2019/0153216 | A1* | 5/2019 | Gong | C08L 83/10 |

FOREIGN PATENT DOCUMENTS

| | | |
|---|---|---|
| CN | 101103073 | 1/2008 |
| CN | 101434743 | 5/2009 |
| CN | 102471569 | 5/2012 |
| CN | 102585474 | 7/2012 |
| CN | 104004328 | 8/2014 |
| CN | 105051110 | 11/2015 |
| CN | 105062027 | 11/2015 |
| CN | 105555868 | 5/2016 |
| CN | 105849171 | 8/2016 |
| CN | 107250270 | 10/2017 |
| CN | 108117735 | * 6/2018 |
| CN | 109294197 | 2/2019 |
| CN | 110499010 | 11/2019 |
| CN | 110591321 | 12/2019 |
| KR | 1020170100081 | 9/2017 |

OTHER PUBLICATIONS

Novista product description for PX200 pp. 1-4 (2024). (Year: 2024).*
ATAMAN Chemicals product description of hypophosphorous acid; pp. 1-8 (2020). (Year: 2020).*
Deya, Zinc Hypophosphite: A Suitable Additive for Anticorrosive Paints to Promote Pigments Synergism; Journal of Coating Technology Research 6(3) pp. 369-376 (2009). (Year: 2009).*
"International Search Report (Form PCT/ISA/210) of PCT/CN2020/103915", mailed on Oct. 20, 2020, with English translation thereof, pp. 1-8.

* cited by examiner

Primary Examiner — David J Buttner
(74) Attorney, Agent, or Firm — JCIPRNET

(57) ABSTRACT

A glass fiber reinforced polycarbonate composite material, a preparation method and an application thereof; the material includes the following components:
  component A: 40 parts to 90 parts of a polycarbonate;
  component B: 1.5 parts to 50 parts of a polysiloxane block copolymer;
  component C: 5 parts to 60 parts of a glass fiber;
  component D: 0.1 parts to 30 parts of a phosphorus-containing compound; and
  component E: 0.01 parts to 30 parts of a polyolefin compound.

14 Claims, No Drawings

GLASS FIBER REINFORCED POLYCARBONATE COMPOSITE MATERIAL, PREPARATION METHOD AND APPLICATION THEREOF

CROSS-REFERENCE TO RELATED APPLICATION

This application is a 371 of international application of PCT application serial no. PCT/CN2020/103915, filed on Jul. 24, 2020, which claims the priority benefit of China application no. 201910815623.7, filed on Aug. 30, 2019. The entirety of each of the above mentioned patent applications is hereby incorporated by reference herein and made a part of this specification.

BACKGROUND

Technical Field

The present invention relates to the technical field of engineering plastics, and in particular relates to a glass fiber reinforced polycarbonate composite material, a preparation method and an application thereof.

Related Art

Polycarbonate resin PC is a kind of engineering thermoplastic with excellent overall properties. In recent years, with its relatively high transparency, good flame retardance, heat resistance, electrical insulating property and dimensional stability, relatively low water absorption and other characteristics, polycarbonate resin PC has been extensively applied in fields such as automobiles, electronic and electrical industry, communications industry, and construction industry. With the expansion of application fields, there are higher demands for polycarbonate on impact strength, flexural modulus, tensile strength, mobility, dielectric loss and other proprieties. Therefore, a simple polycarbonate or conventional polycarbonate material still cannot satisfy the requirements. Hence, polycarbonate materials need to be modified. To promote the material properties and grade to satisfy the requirements of the final parts and customers, glass fiber reinforcement is generally used for improving the processability and modification.

However, there exists a contradiction of high rigidity but low toughness in the existing glass fiber reinforced polycarbonate composite material. A conventional toughening method is to directly add a toughening agent, which will also substantially decrease mobility of a composite material, while an improvement for rigidity and toughness of the composite material is also very limited, thereby seriously limiting the application of the material in fields such as automobiles, electronic and electrical industry, communications industry, and construction industry.

SUMMARY OF INVENTION

To overcome the shortcomings and disadvantages of the prior art, the objective of the present invention is to provide a glass fiber reinforced polycarbonate composite material having both rigidity and toughness as well as having high mobility.

Another objective of the present invention is to provide a preparation method of the above glass fiber reinforced polycarbonate composite material.

A further objective of the present invention is to provide an application of the above glass fiber reinforced polycarbonate composite material.

The present invention is achieved by the following technical solution.

A glass fiber reinforced polycarbonate composite material, includes the following components in parts by weight:
component A: 40 parts to 90 parts of a polycarbonate;
component B: 1.5 parts to 50 parts of a polysiloxane block copolymer;
component C: 5 parts to 60 parts of a glass fiber;
component D: 0.1 parts to 30 parts of a phosphorus-containing compound; and
component E: 0.01 parts to 30 parts of a polyolefin compound.

Preferably, the glass fiber reinforced polycarbonate composite material includes the following components in parts by weight:
component A: 40 parts to 90 parts of the polycarbonate;
component B: 3.5 parts to 45 parts of the polysiloxane block copolymer;
component C: 5 parts to 60 parts of the glass fiber;
component D: 8 parts to 12 parts of the phosphorus-containing compound; and
component E: 6 parts to 10 parts of the polyolefin compound.

In the glass fiber reinforced polycarbonate composite material, a percentage of a siloxane content accounting for a total weight percentage of the composition is 0.6 wt % to 17 wt %, preferably, 2.8 wt % to 12 wt %.

In the glass fiber reinforced polycarbonate composite material, a weight ratio of phosphorus to silicon is 1:0.1 to 1:3.2, preferably, 1:0.6 to 1:2.5.

The polycarbonate is selected from one or more of an aromatic polycarbonate, an aliphatic polycarbonate, an aromatic-aliphatic polycarbonate, and a branched polycarbonate; preferably, the polycarbonate is an aromatic polycarbonate.

Preferably, the aromatic polycarbonate is an aromatic polycarbonate having a viscosity-average molecular weight of 13,000 to 40,000, preferably is an aromatic polycarbonate having a viscosity-average molecular weight of 18,000 to 28,000. When the viscosity-average molecular weight is in the above range, mechanical strength is good and excellent formability may be maintained. The viscosity-average molecular weight is calculated by a solution viscosity with dichloromethane as a solvent at a test temperature of 25° C.

A preparation method of the above polycarbonate may be performed by interfacial polymerization and transesterification method, and a terminal hydroxyl group content may be controlled in the process.

The polysiloxane block copolymer includes a polydimethylsiloxane block and a polycarbonate block of bisphenol A, having a siloxane content of 0.6 wt % to 36 wt % based on a weight of the component B. After adding the siloxane block copolymer, the siloxane content in the glass fiber reinforced polycarbonate composite material can be tested by near-infrared analysis, a test method is as follows: weighing a fixed weight of a glass fiber reinforced polycarbonate composite aggregate, and using methane to uniformly dissolve into a tablet for detection.

The phosphorus-containing compound is selected from an oxygen-bearing phosphoric acid, phosphates and derivatives thereof; the oxygen-bearing phosphoric acid is selected from phosphoric acid and/or hypophosphorous acid; and the phosphates and derivatives thereof are selected from sodium phosphate and/or zinc hypophosphite.

The polyolefin compound is selected from one or more of a saturated linear polyolefin, a polyolefin containing an unsaturated bond, a polyolefin containing partial branched chains, and a modified polyolefin; the saturated linear polyolefin is selected from one or more of polyethylene, polypropylene and polybutylene; the polyolefin containing an unsaturated bond is selected from polybutadiene and derivatives thereof; the polyolefin containing partial branched chains is selected from poly X-olefin; and the modified polyolefin is selected from one or more of epoxy-modified polyolefin and maleic anhydride-modified polyolefin.

Based on the weight of the glass fiber reinforced polycarbonate composite material, the glass fiber reinforced polycarbonate composite material of the present invention may further include a component F: 0 to 10 parts of an additional auxiliary agent; the additional auxiliary agent is selected from one or more of a stabilizer, a flame retardant, an anti-drip agent, a lubricant, a release agent, a plasticizer, a filler, an antistatic agent, an antibacterial agent and a colorant.

A suitable stabilizer may include one or a combination of more of an organic phosphite, such as, triphenyl phosphite, tri-(2,6-dimethylphenyl) phosphite, tri-nonylphenyl phosphite, dimethyl phenylphosphonate, trimethyl phosphate and the like, an organic phosphite, an alkylated monophenol or polyphenol, alkylation reaction products of polyphenol and diene, butylation reaction products of p-cresol or dicyclopentadiene, alkylated hydroquinones, hydroxylated thiodiphenyl ethers, alkylene-bisphenol, benzyl compounds, polyol esters, benzotriazoles, and diphenylketones.

A suitable flame retardant may include a phosphate-based flame retardant or a sulfonate flame retardant. A better phosphate flame retardant includes bisphenol A tetraphenyl diphosphate, triphenyl phosphate, tricresyl phosphate, cresyldiphenyl phosphate, bisphenol A tetracresyl diphosphate, resorcinol tetra(2,6-dimethylphenyl ester) and tetramethylbenzylpiperidin amide; the flame retardant may be also selected from a sulfonate, such as, Rimar salt, potassium perfluorobutanesulfonate, KSS potassium diphenylsulfone sulfonate, sodium benzenesulfonate, and the like, which would be suitable.

A preparation method of the above glass fiber reinforced polycarbonate composite material includes the following steps:
1) weighing the polycarbonate, the polysiloxane block copolymer, the phosphorus-containing compound, the polyolefin compound, and the additional auxiliary agent according to a ratio, stirring and blending for 1 to 3 min in a high-speed mixer to obtain a premix; and
2) placing the obtained premix to a major feeding port of a twin-screw extruder, and adding glass fiber to a side feeding port for melt extrusion, then performing pelleting and drying to obtain the glass fiber reinforced polycarbonate composite material.

The twin-screw extruder has a length-diameter ratio of 46:1 to 50:1; and temperatures of the twin-screw extruder from a feeding section to a head section are successively: 120° C. to 160° C. in a zone I, 200° C. to 230° C. in a zone II, 200° C. to 230° C. in a zone III, 200° C. to 220° C. in a zone IV, 200° C. to 220° C. in a zone V, 200° C. to 220° C. in a zone VI, 200° C. to 220° C. in a zone VII, 200° C. to 220° C. in a zone VIII, 200° C. to 220° C. in a zone IX, 200° C. to 220° C. in a zone X, 200° C. to 220° C. in a zone XI, and 220° C.- to 240° C. in the head section; and a main engine revolution speed is 350 rpm to 500 rpm.

Provided is an application of the glass fiber reinforced polycarbonate composite material obtained by the above preparation method in automobiles, electronic and electrical industry, communications industry, and construction industry.

Compared with the prior art, the present invention has the following beneficial effects.

In the present invention, a polysiloxane block copolymer, a phosphorus-containing compound and a polyolefin compound with a specific content are selected to be added to formula of a glass fiber reinforced polycarbonate composite material so as to ensure that the prepared composite material has a specific siloxane content and a specific weight ratio of phosphorus to silicon, so that the prepared composite material not only has the characteristics of excellent high modulus and high toughness, but also has excellent mobility and processing performances. Compared with conventional reinforcement modification means, the described composite material has both rigidity and toughness, and is especially suitable for fields such as automobiles, electronic and electrical industry, communications industry, and construction industry.

DESCRIPTION OF EMBODIMENTS

The present invention will be further described by detailed implementations hereafter; the following embodiments are preferred implementations of the present invention, but implementations of the present invention are not limited to the following embodiments.

Test standards or methods of each performance:
test mode for Izod unnotched impact strength: according to ASTM D256-2010 standard;
test mode for tensile strength: according to ASTM D638-2014 standard, with a tensile speed of 10 mm/min;
test mode for flexural modulus: according to ASTM D790-2010 standard, with a bending speed of 2 mm/min; and
test mode for mobility: according to ASTM D1238-2013 standard, with a melting temperature of 300° C.

The polycarbonate used in the present invention:
component A-1: aromatic polycarbonate having a viscosity-average molecular weight of 18,000, Idemitsu; and
component A-2: aromatic polycarbonate having a viscosity-average molecular weight of 27,000, Idemitsu.

The polysiloxane block copolymer used in the present invention:
component B-1: polysiloxane block copolymer having a siloxane content of 8 wt %, Idemitsu; and
component B-2: polysiloxane block copolymer having a siloxane content of 34 wt %, Idemitsu.

The glass fiber used in the present invention:
component C-1: TOYOBO.

The phosphorus-containing compound used in the present invention:
component D-1: hypophosphorous acid, Aladdin; and
component D-2: sodium phosphate, Budenheim Chemicals.

The polyolefin compound used in the present invention:
component E-1: polyethylene, manufacturer: Sinopec; and
component E-2: poly X-olefin, manufacturer: Chuangxin Chemicals.

The additional auxiliary agent used in the present invention:
component F-1: stabilizer: 2112, ADEKA; and
component F-2: lubricant: PETS, Lonza.

Embodiments 1 to 8 and Comparative Examples 1 to 6: Preparation of a Glass Fiber Reinforced Polycarbonate Composite Material A polycarbonate, a polysiloxane block copolymer, a phosphorus-containing compound, a polyolefin compound, and an additional auxiliary agent were weighed according to a ratio, stirred and blended for 1 to 3 min in a high-speed mixer to obtain a premix; and the obtained premix was placed to a major feeding port of a twin-screw extruder, and glass fiber was added to a side feeding port for melt extrusion, then subjected to pelleting and drying to obtain the glass fiber reinforced polycarbonate composite material. The Izod notched impact strength, Izod unnotched impact strength, tensile strength, flexural modulus and mobility of the above glass fiber reinforced polycarbonate composite material were tested. Data obtained from the tests are shown in Table 1.

TABLE 1 specific ratios (parts by weight) and test performance results of Embodiments 1 to 8 and Comparative Examples 1 to 6

| | | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|
| Polycarbonate | Component A-1 | 65 | | 65 | 65 | 65 | 65 | 40 | |
| | Component A-2 | | 65 | | | | | | 90 |
| Siloxane block copolymer | Component B-1 | 35 | | | | 20 | | | |
| | Component B-2 | | 35 | 20 | 25 | | 45 | 1.5 | 50 |
| Glass fiber | Component C-1 | 20 | 20 | 20 | 20 | 20 | 20 | 30 | 30 |
| Phosphorus-containing compound | Component D-1 | 10 | | 10 | 10 | 10 | 10 | 30 | 1 |
| | Component D-2 | | 10 | | | | | | |
| Polyolefin compound | Component E-1 | 8 | | 8 | 8 | 8 | 8 | 30 | 1 |
| | Component E-2 | | 8 | | | | | | |
| Other auxiliary agent | Component F-1 | 0.5 | 0.5 | 0.5 | 0.5 | 0.5 | 0.5 | 0.5 | 0.5 |
| | Component F-2 | 0.5 | 0.5 | 0.5 | 0.5 | 0.5 | 0.5 | 0.5 | 0.5 |
| Siloxane content (wt %) | | 2.8 | 11.9 | 6.8 | 8.5 | 1.6 | 13.5 | 1.2 | 17 |
| Weight ratio of phosphorus to silicon | | 1:0.6 | 1:2.5 | 1:0.3 | 1:2.8 | 1:1.0 | 1:1.5 | 1:0.1 | 1:3.2 |
| Izod notched impact strength (kJ/m$^2$) | | 13.7 | 15.4 | 12.8 | 12.5 | 10.7 | 12.3 | 9.7 | 9.2 |
| Izod unnotched impact strength (kJ/m$^2$) | | 40.2 | 39.8 | 35.6 | 32.5 | 31.6 | 32.7 | 28.9 | 28.6 |
| Tensile strength (MPa) | | 113.2 | 111.8 | 110.3 | 110.2 | 108.4 | 109.2 | 105.3 | 103.8 |
| Flexural modulus (MPa) | | 5760 | 5689 | 5678 | 5540 | 5532 | 5287 | 5114 | 5022 |
| Mobility (g/min) | | 32.1 | 28.9 | 25.3 | 23.6 | 24.3 | 22.1 | 19.4 | 19.2 |

| | | Comparative Example 1 | Comparative Example 2 | Comparative Example 3 | Comparative Example 4 | Comparative Example 5 | Comparative Example 6 |
|---|---|---|---|---|---|---|---|
| Polycarbonate | Component A-1 | 65 | 65 | 65 | 65 | 65 | 65 |
| | Component A-2 | | | | | | |
| Siloxane block copolymer | Component B-1 | | | 35 | 35 | 35 | 35 |
| | Component B-2 | 1 | 65 | | | | |
| Glass fiber | Component C-1 | 20 | 20 | 20 | 20 | 20 | 20 |
| Phosphorus-containing compound | Component D-1 | 10 | 10 | 0.05 | 40 | 10 | 10 |
| | Component D-2 | | | | | | |
| Polyolefin compound | Component E-1 | 8 | 8 | 10 | 10 | 0 | 40 |
| | Component E-2 | | | | | | |
| Other auxiliary agent | Component F-1 | 0.5 | 0.5 | 0.5 | 0.5 | 0.5 | 0.5 |
| | Component F-2 | 0.5 | 0.5 | 0.5 | 0.5 | 0.5 | 0.5 |
| Siloxane content (wt %) | | 0.34 | 22.1 | 2.8 | 2.8 | 2.8 | 2.8 |
| Weight ratio of phosphorus to silicon | | 1:0.1 | 1:4 | 1:0.05 | 1:10 | 1:0.6 | 1:0.6 |
| Izod notched impact strength (kJ/m2) | | 5.8 | 7.2 | 6.8 | 6.1 | 4.3 | 5.7 |

TABLE 1-continued specific ratios (parts by weight) and test performance results of Embodiments 1 to 8 and Comparative Examples 1 to 6

| | | | | | | |
|---|---|---|---|---|---|---|
| Izod unnotched impact strength (kJ/m2) | 19.4 | 20 | 18.9 | 17.6 | 15.3 | 14.9 |
| Tensile strength (MPa) | 100.4 | 101 | 98.5 | 99.7 | 96.4 | 98.3 |
| Flexural modulus (MPa) | 4988 | 4798 | 4872 | 4678 | 4639 | 4599 |
| Mobility (g/min) | 6.7 | 6.2 | 4.5 | Too large to exceed the flow path | 5.6 | Too large to exceed the flow path |

What is claimed is:

1. A glass fiber reinforced polycarbonate composite material, comprising the following components in parts by weight:
   component A: 40 parts to 90 parts of a polycarbonate;
   component B: 1.5 parts to 50 parts of a polysiloxane block copolymer;
   component C: 5 parts to 60 parts of a glass fiber;
   component D: 10 parts to 30 parts of a phosphorus-containing compound, wherein the phosphorus-containing compound is hypophosphorous acid; and
   component E: 0.01 parts to 30 parts of a polyolefin compound.

2. The glass fiber reinforced polycarbonate composite material according to claim 1, wherein in the glass fiber reinforced polycarbonate composite material, a percentage of a siloxane content accounting for a total weight percentage of the composite material is 0.6 wt % to 17 wt %.

3. The glass fiber reinforced polycarbonate composite material according to claim 1, wherein the polycarbonate is selected from one or more of an aromatic polycarbonate, an aliphatic polycarbonate, an aromatic-aliphatic polycarbonate, and a branched polycarbonate; the aromatic polycarbonate is an aromatic polycarbonate having a viscosity-average molecular weight of 13,000 to 40,000.

4. The glass fiber reinforced polycarbonate composite material according to claim 1, wherein the polysiloxane block copolymer comprises a polydimethylsiloxane block and a polycarbonate block of bisphenol A, having a siloxane content of 0.6 wt % to 36 wt % based on a weight of the component B.

5. The glass fiber reinforced polycarbonate composite material according to claim 1, wherein the polyolefin compound is selected from a saturated linear polyolefin; the saturated linear polyolefin is selected from polyethylene.

6. The glass fiber reinforced polycarbonate composite material according to claim 1, wherein based on the weight of the glass fiber reinforced polycarbonate composite material, the glass fiber reinforced polycarbonate composite material further comprises a component F: 0 to 10 parts of an additional auxiliary agent; the additional auxiliary agent is selected from one or more of a stabilizer, a flame retardant, an anti-drip agent, a lubricant, a release agent, a plasticizer, a filler, an antistatic agent, an antibacterial agent and a colorant.

7. A preparation method of the glass fiber reinforced polycarbonate composite material according to claim 1, comprising the following steps:
   1) Weighing the polycarbonate, the polysiloxane block copolymer, the phosphorus-containing compound, the polyolefin compound, and the additional auxiliary agent according to a ratio, stirring and blending for 1 to 3 min in a high-speed mixer to obtain a premix; and
   2) placing the obtained premix to a major feeding port of a twin-screw extruder, and adding glass fiber to a side feeding port for melt extrusion, then performing pelleting and drying to obtain the glass fiber reinforced polycarbonate composite material.

8. The preparation method of the glass fiber reinforced polycarbonate composite material according to claim 7, wherein the twin-screw extruder has a length-diameter ratio of 46:1 to 50:1; and temperatures of the twin-screw extruder from a feeding section to a head section are successively: 120° C. to 160° C. in a zone I, 200° C. to 230° C. in a zone II, 200° C. to 230° C. in a zone III, 200° C. to 220° C. in a zone IV, 200° C. to 220° C. in a zone V, 200° C. to 220° C. in a zone VI, 200° C. to 220° C. in a zone VII, 200° C. to 220° C. in a zone VIII, 200° C. to 220° C. in a zone IX, 200° C. to 220° C. in a zone X, 200° C. to 220° C. in a zone XI, and 220° C.-to 240° C. in the head section; and a main engine revolution speed is 350 rpm to 500 rpm.

9. The glass fiber reinforced polycarbonate composite material according to claim 1, comprising the following components in parts by weight:
   component A: 40 parts to 90 parts of the polycarbonate;
   component B: 3.5 parts to 45 parts of the polysiloxane block copolymer;
   component C: 5 parts to 60 parts of the glass fiber;
   component D: 10 parts to 12 parts of the phosphorus-containing compound; and
   component E: 6 parts to 10 parts of the polyolefin compound.

10. The glass fiber reinforced polycarbonate composite material according to claim 9, wherein in the glass fiber reinforced polycarbonate composite material, a percentage of a siloxane content accounting for a total weight percentage of the composite material is 0.6 wt % to 17 wt %.

11. The glass fiber reinforced polycarbonate composite material according to claim 9, wherein the polycarbonate is selected from one or more of an aromatic polycarbonate, an aliphatic polycarbonate, an aromatic-aliphatic polycarbonate, and a branched polycarbonate; the aromatic polycarbonate is an aromatic polycarbonate having a viscosity-average molecular weight of 13,000 to 40,000.

12. The glass fiber reinforced polycarbonate composite material according to claim 9, wherein the polysiloxane block copolymer comprises a polydimethylsiloxane block and a polycarbonate block of bisphenol A, having a siloxane content of 0.6 wt % to 36 wt % based on a weight of the component B.

13. The glass fiber reinforced polycarbonate composite material according to claim 9, wherein the polyolefin compound is selected from a saturated linear polyolefin; the saturated linear polyolefin is selected from polyethylene.

14. The glass fiber reinforced polycarbonate composite material according to claim 9, wherein based on the weight of the glass fiber reinforced polycarbonate composite material, the glass fiber reinforced polycarbonate composite material further comprises a component F: 0 to 10 parts of an additional auxiliary agent; the additional auxiliary agent is selected from one or more of a stabilizer, a flame retardant, an anti-drip agent, a lubricant, a release agent, a plasticizer, a filler, an antistatic agent, an antibacterial agent and a colorant.

\* \* \* \* \*